United States Patent
Hyman (12)

(10) Patent No.: US 6,220,548 B1
(45) Date of Patent: Apr. 24, 2001

(54) DEPLOYED EQUIPMENT MODULES FOR SATELLITE ARCHITECTURE IMPROVEMENT

(75) Inventor: Nelson L. Hyman, Randallstown, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/153,416

(22) Filed: Sep. 14, 1998

(51) Int. Cl.⁷ ..................................................... B64G 1/50
(52) U.S. Cl. .......................................................... 244/158 R
(58) Field of Search ............................ 244/158 R, 173; 165/41

(56) References Cited

U.S. PATENT DOCUMENTS

| | | | |
|---|---|---|---|
| 4,832,113 | * 5/1989 | Mims et al. | 244/158 R X |
| 4,860,467 | 8/1989 | Larson | 38/102.4 |
| 5,027,892 | * 7/1991 | Bannon et al. | 244/158 R X |
| 5,441,069 | 8/1995 | Moss | 135/124 |
| 5,671,791 | 9/1997 | Lapointe | 160/46 |
| 5,806,800 | * 9/1998 | Caplin | 244/158 R X |
| 5,931,418 | * 8/1999 | Eller et al. | 244/158 R X |

OTHER PUBLICATIONS

Hyman; An Alternative To Deployed Thermal Radiators: Deployed Equipment Modules With Individual Package Temperature ; 11ᵗʰ AIAA/USU Conference On Small Satellites; pp. 1–2; Sep. 1997.

* cited by examiner

Primary Examiner—Robert P. Swiatek
(74) Attorney, Agent, or Firm—Barry A. Edelberg; Charles J. Stockstill

(57) ABSTRACT

Deployed equipment modules for satellite architecture improvement (DEMSAI) provide ample thermal radiator for area-limited small satellites that typically deploy large-area solar panels from a relatively small mainbody. Rectangular-box-shaped equipment modules are deployed from a compact stowed assembly to offer each of their six side panel exteriors as potential radiator area. Equipment packages are mounted to the interior of these panels. The resultant increase in radiator area translates to an increase in the power-handling capacity of small, fixed-body satellites without resort to deployed radiators.

8 Claims, 4 Drawing Sheets

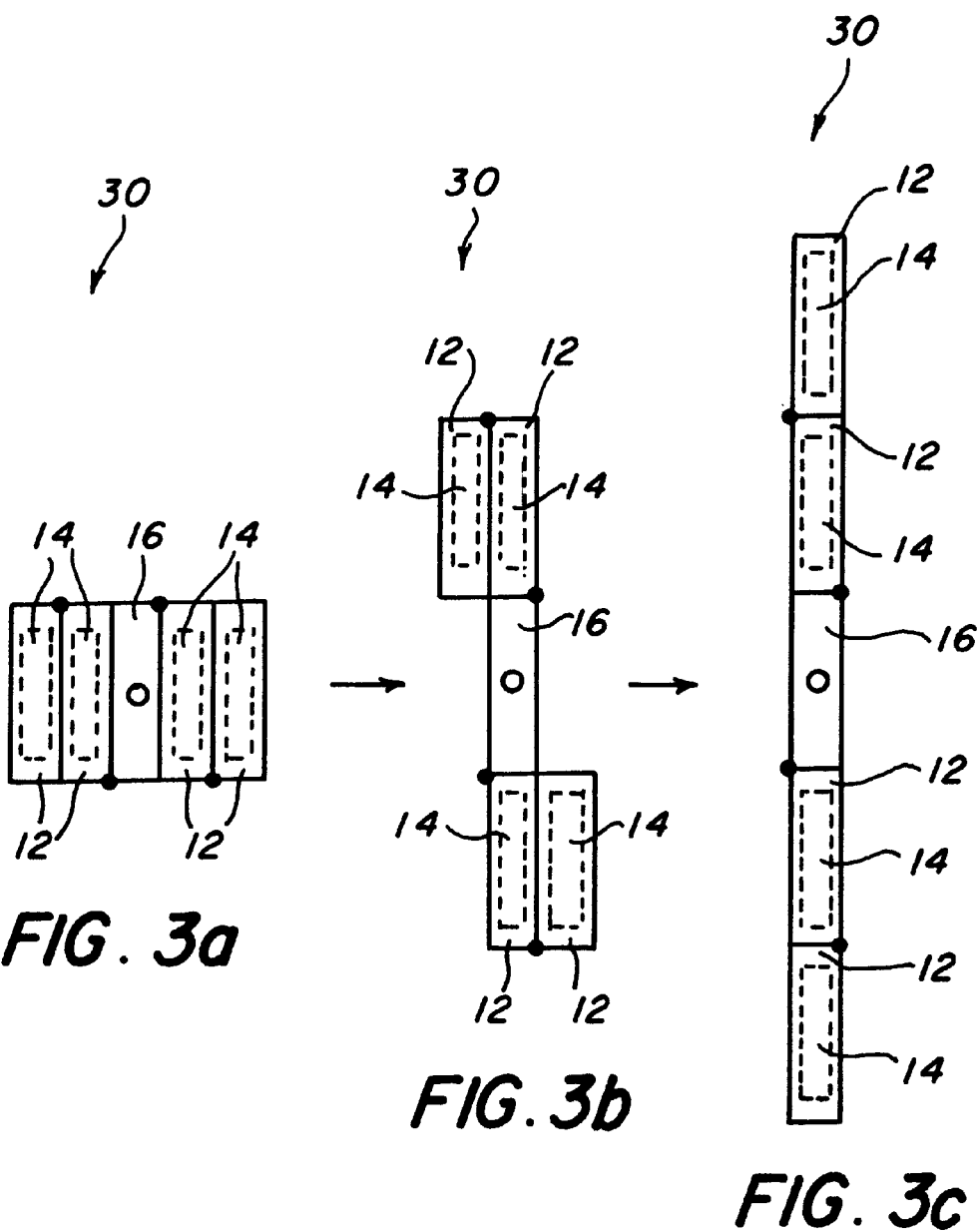

DEPLOYED EQUIPMENT MODULES FOR SATELLITE ARCHITECTURE IMPROVEMENT

BACKGROUND OF THE INVENTION

1. Field of the Invention

This invention pertains generally to thermal radiators and more specifically to thermal radiators on depolyable equipment modules for satellite application.

2. Description of the Related Art

Organizations developing small satellites are faced with dense packaging of on-board equipment and deploying large and light solar arrays from small stowage volumes. The trends in electronics miniaturization, denser component packaging, increasing solar array deployed area-to-stowed volume ratio, and even smaller and lighter satellites and launch vehicles are resulting in a higher ratio of power dissipation to satellite body volume. Electrical power dissipation must ultimately be thermally radiated from a satellite to the space sink by way of external radiating surfaces (radiators), and the inviolate laws of physics dictate the watts per unit area upper limit.

Deployable thermal radiators are components of conventional, but "cutting edge" technology, temperature control systems. In addition to the usual deployment mechanisms, there must be a means to connect radiator and mainbody thermally, conductively either across the rotating joint-hinge line materials (high conductance is not to be expected), or via heat pipe plumbing between radiator and mainbody through a flexible joint. Deployed radiators and associated plumbing are 100% added mass and carry a high total cost per unit area. To minimize mass and cost, they are usually rather precisely sized for their role as part of a conventional satellite active temperature control system. Excess radiator area to provide for a comfortably large hot case margin is a costly luxury not usually or readily obtained. Fluid loops within lightweight deployed radiators are more susceptible to failure as a result of micrometeorite penetration than heat pipes within, and protected by, satellite structure.

SUMMARY OF THE INVENTION

The object of this invention is to provide a means for satisfactory temperature control for satellites of high power-to-volume ratios, with nominal external area insufficient for required thermal radiators.

This and other objectives are accomplished by deployed equipment modules for satellite architecture improvement (DEMSAI) which increases the external thermal-radiator area of a satellite and increases the satellite's capacity for high density equipment packaging and total electrical power while providing satisfactory temperature control. This is accomplished by deploying box-shaped structures (modules) stowable within a minimum volume geometry around a "mainbody bus" to accommodate fit into a "small" launch vehicle. Each of the modules' exterior panels can accommodate a radiator surface on its exterior while its interior serves as a mounting deck for equipment packages.

BRIEF DESCRIPTION OF THE DRAWINGS

FIG. 3(a) shows a four-module configuration in a stacked position around a satellite bus.

FIG. 3(b) shows the four-modules in a partially deployed position.

FIG. 3(c) shows the four-modules in a fully deployed flat-plane configuration.

DESCRIPTION OF THE PREFERRED EMBODIMENT

Figure 1A:
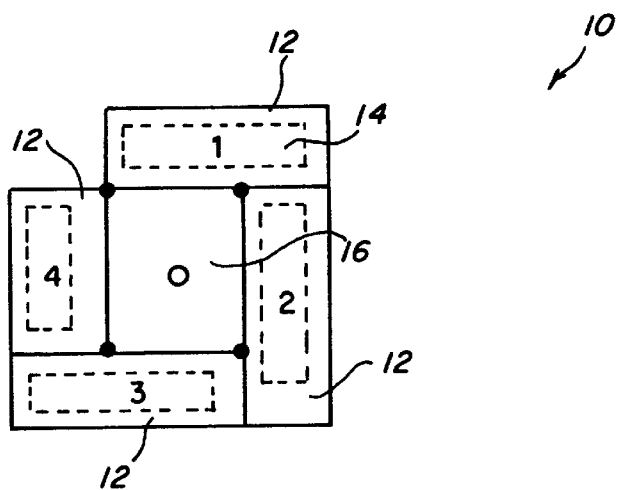
FIG. 1(a) shows four-modules in a stowed position around a satellite mainbody "bus".

A typical deployed equipment module for satellite architecture improvement (DEMSAI) 10 provides ample thermal radiator area for volume-limited small satellites deploying large-area solar panels (not shown) from a relatively small mainbody. Modules, 12 are deployed from a compact stowed assembly, as shown in FIG. 1a, to offer each of their side panel exteriors as potential radiator area 14. All rectangular-box-shaped equipment packages of temperature sensitive equipment mount to the interior of these modules 12 and a thermal radiation area 14 forms the outer surface. The modules 12 with the interior equipment packages and the exterior radiator areas 14 share approximately same area. A temperature control method, such as that shown in U.S. Pat. No. 5,535,815, Hyman, Jul. 16, 1996, would provide a sufficient transfer of internal heat to the module's 12 exterior radiator area 14.

In the preferred embodiment of a DEMSAI 10, a satellite (not shown) would usually be a "minimum volume" configuration (approximately cubical in shape) in the stowed non-deployed launch configuration, as shown in FIG. 1(a). Deployable solar panels (not shown) are typically stowed parallel to the plane of the figures, "o" indicating a panel rotation-arm axis on a satellite. Each deployable module 12 has a potential for each of its panels to be a mounting deck with a radiator area 14 exterior, albeit with possible radiative flux input from sun, Earth, and module neighbors. The power dissipation capacity of the total of deployed modules 12 contained within the "stowed launch volume" is much larger than that found in a conventional satellite configuration.

Figure 1B:
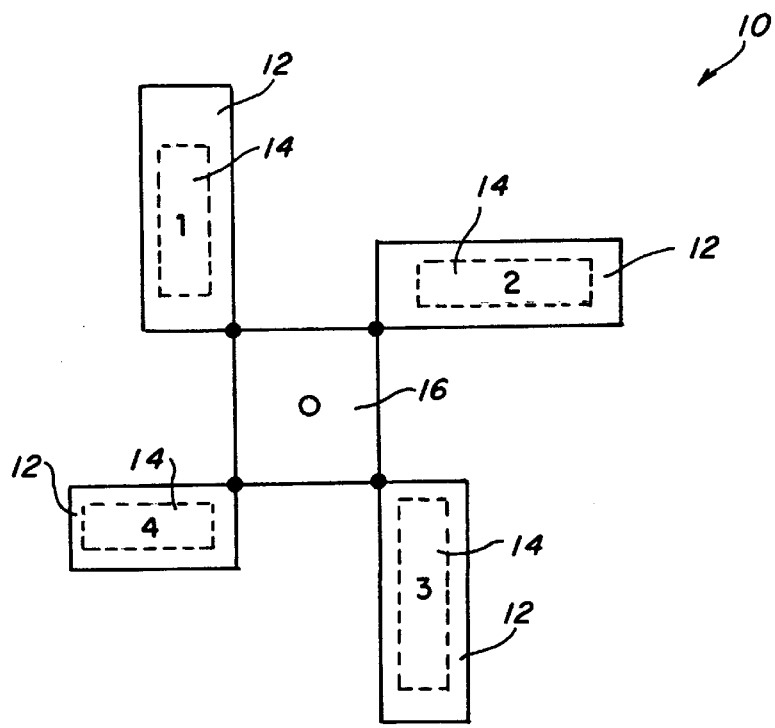
FIG. 1(b) shows the four-module configuration in its deployed position.

After launch, the four modules 12 each deploy, as shown in FIG. 1(b), in turn, through a 90° rotation, forming an extended array of modules 12, exposing the exterior radiator areas 14 to a space sink. The resultant increase in radiator area 14 translates to an increase in the power-handling capacity of small, fixed-body satellites (not shown) without resort to additionally deployed radiators.

Figure 2A:
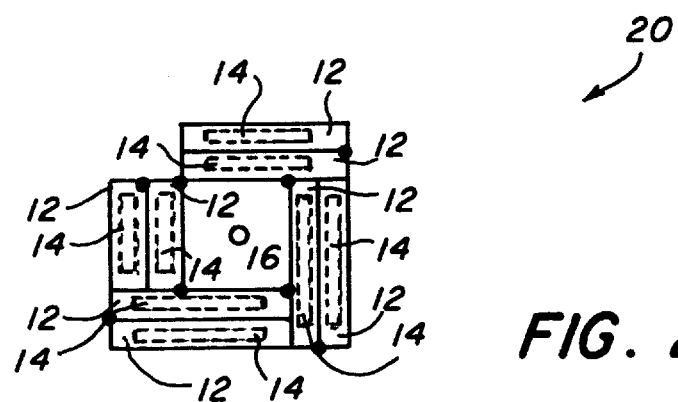
FIG. 2 shows an eight-modules in a stowed position around a satellite bus.
FIG. 2(b) shows the eight-module configuration in its deployed position.
Figure 2B:
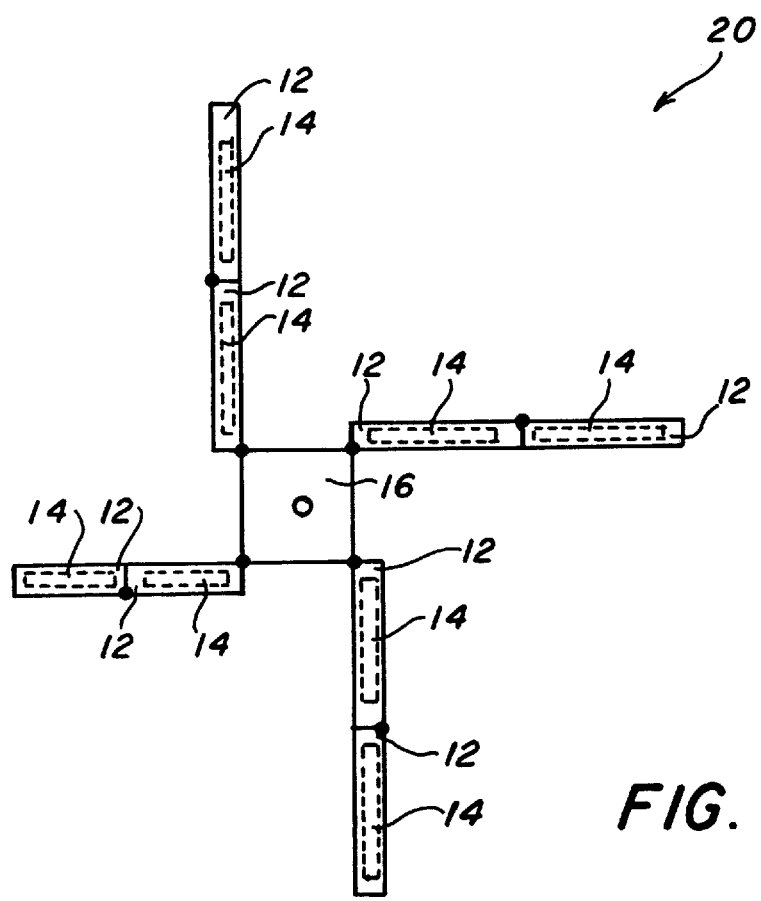

In another embodiment, an 8-module configuration 20 is shown in the stowed position in FIG. 2(a) and deployed in FIG. 2(b), each module 12 of the 4-module configuration shown in FIG. 1(b) becomes two, with one going through an additional 180° deployment, for a total of eight fully deployed separate modules 12 and a significant increase in external radiation area 14.

Another preferred embodiment 30, as shown in FIG. 3(a) in a stowed configuration provides a larger effective area, helped by zero intra-module thermal radiation. In this embodiment 30, four modules 12 unfold in two-steps; first, as shown in FIG. 3(b); then unfold into a four module 12 planar configuration, as shown in FIG. 3(c).

Figure 4:
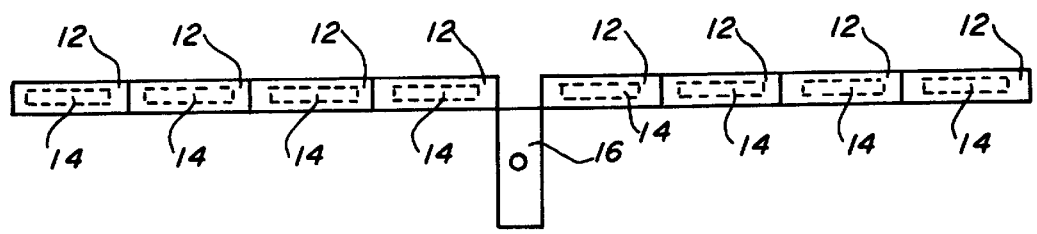
FIG. 4 shows an eight-module flat-plane deployment and a central satellite bus.

Another embodiment 40 demonstrates that the area increase utilizing such a configuration may be theoretically unlimited, as this configuration may be applied for any number of modules 12; eight are shown in FIG. 4.

The deployed modules 12 receive direct and reflected radiative flux from Earth and Sun. Because the module 12 external radiative environment is variable and satellite-particular, there are many variations of the basic concept as shown in the described embodiments. The technology for module-to-mainbody bus 16 or module-to-module connections with electrical or optical fiber cabling (not shown), radio frequency connections (not shown), or propellant lines (not shown) is well developed and well known to those skilled in the art. The mechanical deployment items such as springs, hinges, and release mechanisms (not shown) are commercially available and flight demonstrated (e.g., for solar cell arrays) and well known to those skilled in the art.

With adequate radiator area 14 and heater power, the simplest, most familiar, and most easily implemented conventional thermal control system for relatively small box-shape modules 12 is the semi-active, based on radiator area 14 sized for satisfactory hot-case temperatures and thermostatically-controlled heaters to maintain cold-case temperatures. Each internal package of the modules 12 is dedicated to a specific radiator 14 on the external deck surface opposite its mounting footprint. The radiator area 14 exposed can be smaller or larger than this footprint. A multi-layer-insulation (MLI) thermal blanket (not shown) covers all module 12 external area that is not devoted to radiator area 14. Required radiator area 14 is calculated in the thermal design process, and all "excess" external area beyond this is MLI covered. Lateral heat conduction through the module 12 mounting decks (not shown) may require augmentation. This is well known to those skilled in the art.

Active temperature control (to minimize heater power requirements) in the form of radiator-covering, emittance-modulating "louvers," is possible in the design, but these devices have traditionally been burdened with low effectiveness, imprecise temperature feedback, complexity, high mass and cost, and limited reliability.

The concept of providing each individual equipment package in a module 12 with an active control thermal switch (not shown) to modulate package-to-deck thermal conductance as a function of module 12 package temperature (isolating packages from module 12 mounting decks (not shown) during cold conditions) is a most feasible approach for an active thermal control system (TCS). This concept will provide for a cold case heater power lower than any contemporary semi-active or active TCS, such as that found in U.S. Pat. No. 5,535,815, and makes highly efficient uses of radiator area on external surfaces directly opposite package mounting footprints. Unlike the semi-active TCS, external area may be devoted totally to a radiator area 14, since there is no viable concern with a "too-cold" equipment mounting panel (not shown).

The deployed-module 12 architecture has merit for satellites (not shown) requiring radiator area 14 beyond that on a small-volume, limited-area mainbody. Modules 12 and their stowed assembly and deploying arrangement may be configured for virtually any number of modules 12 and deployments to provide for any conceivable required radiator area 14 heat rejection. The radiator area 14 increases of the preferred embodiments herein described range from approximately 50 to 300%. Area increase is sensitive to module 14 length-to-height aspect ratio.

When compared to deploying radiators with their demanding requirements for heat transport across the hinge line and complex heat transport paths of fluid lines, equipment module 12 deployment (the release and rotation of a box-shaped module 12 about a hinge line shared with its mainbody or another module 14) is a simple mechanical function involving non-exotic release mechanisms, hinges, springs, etc. State-of-the-art hardware and precautions assure that the flexible electrical cables and propellant lines connecting modules 12 do not interfere with deployment while maintaining electrical or fluid-pressure integrity.

A module 12 carries its own radiaton area 14 (mounting deck exteriors) at no cost in "added" satellite mass, unlike deployed radiators. DEMSAI 10 lends itself readily to the modular, or common bus 16 concept based on a hinged and deployed structural framework, with provisions for cabling and connectors, into which identically configured modules 12 are readily inserted and removed. The excess-radiator-area module 12 with temperature control for its mounting decks (not shown), or individual actively controlled thermal switches (not shown) for each mounted package, fit the definition of "thermal bus".

Further, DEMSAI 10 provides external area for mounting a multitude of antennas or sensors, and provides increased satellite dimensions for greater attitude control thruster moment-arm and gravity-gradient stabilization. Virtually any radiator area 14 (or satellite breadth) increase relative to the original satellite mainbody may be achieved using the DEMSAI 10 concept.

This concept of increasing thermal radiating area 14 through deployment of equipment modules 12 is not restricted to any particular satellite geometry, and it can be utilized to achieve virtually any reasonably large increase in radiator area 14 to suit a particular power and temperature requirement of a satellite payload. The plurality of deployed modules 12 has a combined total area of exposed radiators that is adequately and sufficiently large enough for temperature control of the power dissipating mounted equipment.

Although the invention has been described in relation to an exemplary embodiment thereof, it will be understood by those skilled in the art that still other variations and modifications can be affected in the preferred embodiment without detracting from the scope and spirit of the invention as described in the claims.

What is claimed is:

1. Deployable equipment modules for a satellite comprised of:
    a plurality of modules stowed in a folded position around a common bus prior to launch of the satellite;
    a temperature sensitive equipment package mounted internally on each module of the plurality of modules;
    each module having an external thermal radiator area to control the package temperature within predetermined limits; and
    means for deploying the modules to form an extended array of modules exposing the radiator areas to a space sink after the satellite reaches orbital condition.

2. A deployable equipment module, as in claim 1, wherein the means for deploying the modules to form an extended array of modules is a system of non-exotic release mechanisms, hinges, and springs.

3. A deployable equipment module, as in claim 1, wherein each temperature sensitive equipment package is further comprised of an active temperature control device.

4. A deployable equipment module, as in claim 1, wherein each temperature sensitive equipment package is further comprised of a semi-active temperature control device.

5. A deployable equipment module, as in claim 1, wherein each module is further comprised of a multi-layer-insulation thermal blanket covering all module external areas not devoted to radiator area.

6. Deployable equipment modules for a satellite comprised of:
- a plurality of modules stowed in a folded position around a common bus prior to launch of the satellite;
- a temperature sensitive equipment package mounted internally on each module of the plurality of modules;
- each temperature sensitive equipment package having an active temperature control device;
- each module having a external thermal radiator area to control the package temperature within predetermined limits;
- a multi-layer-insulation thermal blanket covering all module external areas not devoted to radiator area; and
- a system of non-exotic release mechanisms, hinges, and springs for deploying the modules to form an extended array of modules exposing the radiator areas to a space sink after the satellite reaches orbital condition.

7. Deployable equipment modules for a satellite comprised of:
- a plurality of modules stowed in a folded position around a common bus prior to launch of the satellite;
- a temperature sensitive equipment package mounted internally on each module of the plurality of modules;
- each temperature sensitive equipment package having a semi-active temperature control device;
- each module having a external thermal radiator area to control the package temperature within predetermined limits;
- a multi-layer-insulation thermal blanket covering all module external areas not devoted to radiator area; and
- a system of non-exotic release mechanisms, hinges, and springs for deploying the modules to form an extended array of modules exposing the radiator areas to a space sink after the satellite reaches orbital condition.

8. A method for deploying equipment modules on a satellite to control temperature of the equipment within predetermined limits; comprising the steps of:
- mounting a temperature sensitive equipment package internally on each module of a plurality of modules;
- stowing the plurality of modules in a folded position around a common bus prior to launch of the satellite; and
- deploying the modules to form an extended array of modules exposing an external radiator area of the modules to a space sink after the satellite reaches orbital condition.

* * * * *